United States Patent
Lee et al.

(10) Patent No.: US 10,146,182 B2
(45) Date of Patent: Dec. 4, 2018

(54) HOLOGRAPHIC IMAGE DISPLAY DEVICE

(71) Applicant: SAMSUNG DISPLAY CO., LTD., Yongin-Si, Gyeonggi-Do (KR)

(72) Inventors: Hye Sog Lee, Osan-si (KR); Yun Seon Do, Hwaseong-si (KR); Jae Joong Kwon, Suwon-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 113 days.

(21) Appl. No.: 15/214,721

(22) Filed: Jul. 20, 2016

(65) Prior Publication Data
US 2017/0192389 A1  Jul. 6, 2017

(30) Foreign Application Priority Data
Jan. 5, 2016 (KR) .................. 10-2016-0001025

(51) Int. Cl.
G03F 1/22 (2012.01)
G03H 1/22 (2006.01)
G02B 26/00 (2006.01)
G03H 1/08 (2006.01)

(52) U.S. Cl.
CPC ......... G03H 1/2294 (2013.01); G02B 26/005 (2013.01); G03H 1/0866 (2013.01); G03H 1/2205 (2013.01); G03H 1/2286 (2013.01); G02B 2207/115 (2013.01); G03H 2001/2292 (2013.01); G03H 2223/18 (2013.01); G03H 2225/31 (2013.01); G03H 2225/32 (2013.01)

(58) Field of Classification Search
CPC .... G03H 1/2294; G03H 2210/30; G03H 1/08; G11B 7/0065

USPC .............. 359/2–35, 237–240, 242, 245–246, 359/250–252, 265–271, 290–298; 349/38–40; 345/107
See application file for complete search history.

(56) References Cited

U.S. PATENT DOCUMENTS

| 2011/0188106 A1* | 8/2011 | Bae ........................ G02B 26/08 |
| | | 359/226.3 |
| 2013/0021388 A1* | 1/2013 | Choi ........................ G02B 5/06 |
| | | 345/690 |
| 2014/0168754 A1* | 6/2014 | Kim .................... G02B 27/2242 |
| | | 359/316 |

(Continued)

FOREIGN PATENT DOCUMENTS

KR  1020140042264   4/2014
KR  1020140121963   10/2014

OTHER PUBLICATIONS

Smith, Neil R., et al. "Agile wide-angle beam steering with electrowetting microprisms." Optics Express, vol. 14, No. 14 Jul. 10, 2006, pp. 6557-6563.

(Continued)

*Primary Examiner* — William R Alexander
*Assistant Examiner* — Tamara Y Washington
(74) *Attorney, Agent, or Firm* — F. Chau & Associates, LLC (57) ABSTRACT

A holographic image display device includes a backlight for emitting light. An optical path adjuster includes a plurality of electrowetting prisms. Each of the plurality of electrowetting prisms is configured to adjust an optical path of the light. A spatial light modulator includes a plurality of pixels. Each of the plurality of pixels is configured to modulate an amplitude or a phase of the light.

9 Claims, 8 Drawing Sheets

(56) References Cited

U.S. PATENT DOCUMENTS

2014/0176671 A1   6/2014  Choi et al.
2016/0065955 A1*  3/2016  Kim .................... G03H 1/0005
                                                    348/54

OTHER PUBLICATIONS

Hou, L., et al. "A full description of a scalable microfabrication process for arrayed electrowetting microprisms." Journal of Micromechanics and Microengineering 20 (2010), pp. 1-12.
Liu, Yuan-Zhi, et al. "Viewing-angle enlargement in holographic augmented reality using time division and spatial tiling." Optics Express, vol. 21, No. 10, May 20, 2013, pp. 12068-12076.
Hahn, Joonku, et al. "Wide viewing angle dynamic holographic stereogram with a curved array of spatial light modulators." Optics Express, vol. 16, No. 16, Aug. 4, 2008, pp. 12372-12386.

* cited by examiner

HOLOGRAPHIC IMAGE DISPLAY DEVICE

CROSS-REFERENCE TO RELATED APPLICATION

This application claims priority under 35 U.S.C. § 119 to Korean Patent Application No. 10-2016-0001025, filed in the Korean Intellectual Property Office on Jan. 5, 2016, the disclosure of which is incorporated by reference herein in its entirety.

TECHNICAL FIELD

The present invention relates to a display device, and more particularly, to a holographic image display device.

DISCUSSION OF THE RELATED ART

A holographic image display device provides a user with a three-dimensional (3D) image of an actual object by generating a holographic image at a given spatial position.

Holography is classified into analog holography and digital holography. In analog holography, coherent light, such as a laser beam, is split into an object beam and a reference beam. The object beam is directed toward an actual object, it is scattered by the actual object, and then it is incident on a surface of an optical recording material. The reference beam is directed onto the optical recording material directly. Accordingly, an interference pattern of the object beam and reference beam may be recorded on the optical recording material. When a restoring beam, identical to the reference beam, is directed onto the optical recording material that has such an interference pattern stored thereon, a holographic image may be created.

Analog holography may record a beam's interference pattern with a high resolution. However, use of analog holography is limited due to the cost and size of an analog holography apparatus.

A digital holographic image display device uses a spatial light modulator (SLM) instead of the optical recording material. The SLM may generate an interference pattern in real time depending on an input signal. Light transmitted through the SLM reconstructs a holographic image that corresponds to the interference pattern.

However, the SLM causes the resolution of the holographic image to be lower than that of the holographic image stored in the optical recording material. For example, the optical recording material may record an interference pattern with resolution of less than about 1 µm. However, a generally commercialized SLM may have a resolution of about 10 µm due to its pixel pitch.

Since the pixel pitch of the SLM is relatively large, a diffraction angle of light passing through the SLM is small. Accordingly, the digital holographic display device has a narrow viewing angle through which the user can see the holographic image.

SUMMARY OF THE INVENTION

According to an exemplary embodiment of the present invention, a holographic image display device uses electrowetting prisms to achieve a wide viewing angle.

According to an exemplary embodiment of the present invention, a holographic display device includes a backlight for emitting light. An optical path adjuster includes a plurality of electrowetting prisms. Each of the plurality of electrowetting prisms is configured to adjust an optical path of the light. A spatial light modulator includes a plurality of pixels. Each of the plurality of pixels is configured to modulate an amplitude or a phase of the light.

In an exemplary embodiment of the present invention, the optical path adjuster is disposed between the backlight and the spatial light modulator. The optical path adjuster adjusts the optical path of the light emitted from the backlight, and the spatial light modulator modulates the amplitude or the phase of the light having the adjusted optical path.

In an exemplary embodiment of the present invention, the spatial light modulator is disposed between the backlight and the optical path adjuster. The optical path adjuster adjusts the optical path of the light modulated by the spatial light modulator.

In an exemplary embodiment of the present invention, each of the plurality of electrowetting prisms includes electrodes and an interface-determining material. The interface-determining material of each of the plurality of electrowetting prisms includes a first interface surface, and a shape of the first interface surface varies according to voltages applied to the electrodes.

In an exemplary embodiment of the present invention, the light emitted from the backlight is refracted at the first interface surface of the interface-determining material of each of the plurality of electrowetting prisms. The angle in which the light is refracted at the first interface surface of the interface-determining material of each of the plurality of electrowetting prisms is based on a shape of the corresponding first interface surface.

In an exemplary embodiment of the present invention, each of the plurality of electrowetting prisms includes first and second electrodes facing each other in a first direction, and third and fourth electrodes facing each other in a second direction. The first direction is perpendicular to a direction of light incident on the electrowetting prisms, and the second direction perpendicular to the first direction and to the direction of the light incident on the electrowetting prisms.

In an exemplary embodiment of the present invention, when different voltages are applied to the first and second electrodes of one of the plurality of electrowetting prisms, a direction of the light that is incident to the one of the plurality of electrowetting prisms is changed along the first direction when passing through the one of the plurality of electrowetting prisms.

In an exemplary embodiment of the present invention, a viewing angle in the first direction is increased when the direction of the light that is incident to the one of the plurality of electrowetting prisms is changed along the first direction.

In an exemplary embodiment of the present invention, when different voltages are applied to the third and fourth electrodes of one of the plurality of electrowetting prisms, a direction of the light that is incident to the one of the plurality of electrowetting prisms is changed along the second direction when passing through the one of the plurality of electrowetting prisms.

In an exemplary embodiment of the present invention, a viewing angle in the second direction is increased when the direction of the light that is incident to the one of the plurality of electrowetting prisms is changed along the second direction.

In an exemplary embodiment of the present invention, a distance between a holographic image, created by the holographic image display device, and the holographic image display device is reduced when the direction of the light that is incident to the one of the plurality of electrowetting prisms is changed along the first or second direction.

According to an exemplary embodiment of the present invention, a holographic image display device includes a backlight, an optical path adjuster disposed on the backlight, and a spatial light modulator disposed on the backlight. The optical path adjuster is configured to refract light emitted from the backlight in a first direction and in a second direction that crosses the first direction. An angle of refraction of the light in the first and second directions is proportional to voltages applied to the optical path adjuster. The spatial light modulator is configured to modulate an amplitude or a phase of the light emitted from the backlight in the first and second directions.

In an exemplary embodiment of the present invention, the optical path adjuster is disposed between the backlight and the spatial light modulator. The optical path adjuster includes an electrowetting prism, and the spatial light modulator includes a pixel that corresponds to the electrowetting prism. The electrowetting prism is configured to refract the light emitted from the backlight in the first and second directions based on the voltages applied to the optical path adjuster, and the pixel diffracts the refracted light, having passed through the electrowetting prism, in the first and second directions.

In an exemplary embodiment of the present invention, the electrowetting prism includes first and second electrodes disposed along the first direction, and third and fourth electrodes disposed along the second direction. The electrowetting prism includes an interface-determining material, wherein the interface-determining material is disposed between the first and second electrodes and between the third and fourth electrodes.

In an exemplary embodiment of the present invention, the light emitted from the backlight is not refracted by the electrowetting prism when no voltage is applied to the first, second, third and fourth electrodes.

In an exemplary embodiment of the present invention, when different voltages are applied to the first and second electrodes, a shape of the interface-determining material changes inside of the electrowetting prism, and the light emitted from the backlight is refracted in the first direction while passing through the electrowetting prism.

In an exemplary embodiment of the present invention, when different voltages are applied to the third and fourth electrodes, a shape of the interface-determining material changes inside of the electrowetting prism, and the light emitted from the backlight is refracted in the second direction while passing through the electrowetting prism.

In an exemplary embodiment of the present invention, a size of the electrowetting prism is smaller than a size of the pixel.

In an exemplary embodiment of the present invention, a viewing angle of the holographic image display device in the first direction is a sum of a first angle and a second angle, and a viewing angle of the holographic image display device in the second direction is a sum of a third angle and a fourth angle. The first angle is an angle by which the optical path adjuster refracts the light in the first direction, and the second angle is an angle by which the spatial light modulator diffracts the light in the first direction. The third angle is an angle by which the optical path adjuster refracts the light in the second direction, and the fourth angle is an angle by which the spatial light modulator diffracts the light in the second direction.

In an exemplary embodiment of the present invention, the spatial light modulator is disposed between the backlight and the optical path adjuster. The optical path adjuster includes an electrowetting prism, and the spatial light modulator includes a pixel that corresponds to the electrowetting prism. The pixel diffracts the light emitted from the backlight in the first and second directions, and the electrowetting prism is configured to refract the diffracted light, having passed through the pixel, in the first and second directions.

BRIEF DESCRIPTION OF THE DRAWINGS

The above and other features and aspects of the present invention will become more apparent by describing in detail exemplary embodiments thereof with reference to the accompanying drawings, in which.

DETAILED DESCRIPTION OF THE EMBODIMENTS

The present invention will be described more fully hereinafter with reference to the accompanying drawings. However, the described embodiments may be modified in various different ways without departing from the spirit and scope of the present invention.

Like reference numerals may designate like elements throughout the specification.

In the drawings, the size and thickness of each element, layer, film, panel, region, etc., may be exaggerated for clarity.

Figure 1A:
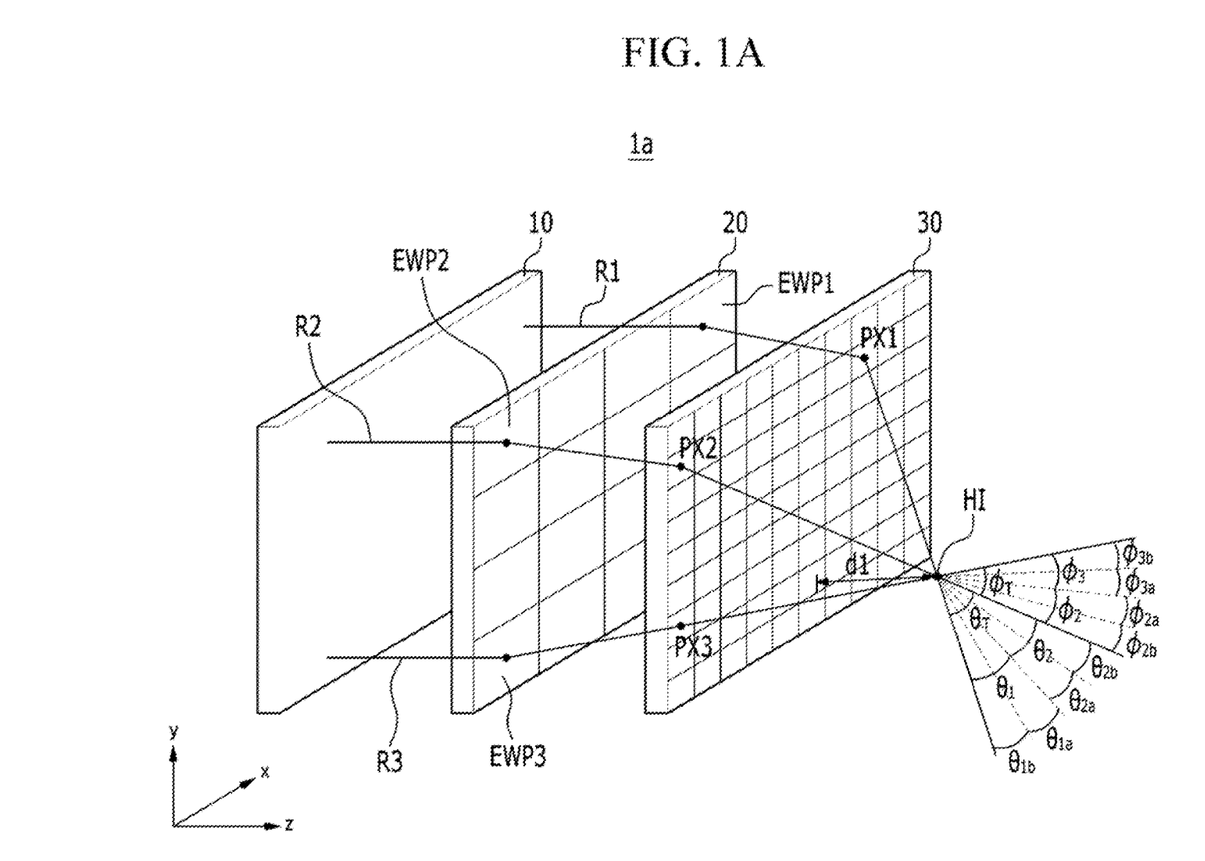
FIG. 1A is an exploded perspective view illustrating a holographic image display device according to an exemplary embodiment of the present invention.

FIG. 1A is an exploded perspective view illustrating a holographic image display device according to an exemplary embodiment of the present invention.

Referring to FIG. 1A, the holographic image display device 1a, according to an exemplary embodiment of the present invention, includes a backlight 10, an optical path adjuster 20, and a spatial light modulator (SLM) 30.

The backlight 10 emits light. The backlight 10 may include a laser light source, and may emit a laser beam. In an exemplary embodiment of the present invention, the backlight 10 may include a light emitting diode (LED) light source. When the light source of the backlight 10 is the LED light source, the backlight 10 may further include a spatial filter or a pinhole for increasing spatial coherence of the emitted light.

The optical path adjuster 20 includes a plurality of electrowetting prisms EWP1 to EWPn (where n is an integer greater than 1). For example, the optical path adjuster 20 includes the electrowetting prisms EWP1, EWP2 and EWP3. The electrowetting prisms EWP1 to EWPn adjust an optical path of light (e.g., light emitted from the backlight 10) that passes through each of the electrowetting prisms EWP1 to EWPn. The structure of the electrowetting prisms EWP1, EWP2 and EWP3, will be described in detail with reference to FIGS. 2A to 4B. The electrowetting prisms EWP1, EWP2 and EWP3 may be arranged in a matrix. A size of each of the electrowetting prisms EWP1, EWP2 and EWP3 may be larger than that of each pixel PX1, PX2 and PX3 of the SLM 30. The pixels PX1, PX2 and PX3 may correspond to the electrowetting prisms EWP1, EWP2 and EWP3.

In an exemplary embodiment of the present invention, the optical path adjuster 20 is positioned between the backlight 10 and the SLM 30. The optical path adjuster 20 adjusts the optical path of the light emitted from the backlight 10.

The SLM 30 includes a plurality of pixels PX1 to PXn (where n is an integer greater than 1). For example, the SLM 30 includes the pixels PX1, PX2 and PX3, which, as stated above, may correspond to the electrowetting prisms EWP1, EWP2 and EWP3. The pixels PX1, PX2 and PX3 modulate an amplitude and/or a phase of the transmitted light. The pixels PX1, PX2 and PX3 may be arranged in a matrix form. In an exemplary embodiment of the present invention, the pixels PX1, PX2 and PX3 may respectively include a pixel electrode, an opposing electrode, and a liquid crystal (LC) layer interposed therebetween. An electric field generated by the pixel electrode and the opposing electrode may change arrangement of LCs included in the LC layer. The amplitude and/or phase of the light passing through the LC layer may be modulated according to the arrangement of the LCs.

A process of generating a holographic image HI using lights R1, R2 and R3, emitted from the backlight 10, will now be described. The lights R1 and R2 are used to describe a horizontal viewing angle $\theta_T$ of the holographic image display device 1a. The lights R2 and R3 are used to describe a vertical viewing angle $\varnothing_T$ of the holographic image display device 1a. A description of a refraction angle of the light R1 in a vertical direction and a refraction angle of the light R3 in a horizontal direction will be omitted.

The light R1, emitted from the backlight 10, is refracted in the horizontal and vertical directions, depending on a refraction angle of the electrowetting prism EWP1. The light R1 is refracted in the horizontal and vertical directions (x) and (y) while passing through the electrowetting prism EWP1. An optical path of the light R1 is changed by an angle $\theta_{1a}$ in the horizontal direction (−x) by the electrowetting prism EWP1. The angle $\theta_{1a}$ depends on the refraction angle of the electrowetting prism EWP1.

The light R1, transmitted through the electrowetting prism EWP1, is incident on the pixel PX1 of the SLM 30. The light R1 may be diffracted by an angle of $\theta_{1b}$ in the horizontal direction (−x) by the pixel PX1. The angle $\theta_{1b}$ depends on a diffraction angle associated with a pixel pitch of the pixel PX1. In this case, the amplitude and/or phase of the light R1 may be modulated by control of the SLM 30.

The light R2 is refracted in the horizontal and vertical directions depending on a refraction angle of the electrowetting prism EWP2 while passing through the electrowetting prism EWP2. In an exemplary embodiment of the present invention, the light R2 is refracted by an angle $\theta_{2a}$ in the horizontal direction (x), and is refracted by an angle $\varnothing_{2a}$ in the vertical direction (−y), while passing through the electrowetting prism EWP2.

The light R2, transmitted through the electrowetting prism EWP2, is incident on the pixel PX2 of the SLM 30. The light R2 may be diffracted by an angle $\theta_{2b}$ in the horizontal direction (x) and may be diffracted by an angle $\varnothing_{2b}$ in the vertical direction (−y) by the pixel PX2. The angles $\theta_{2b}$ and $\varnothing_{2b}$ depend on a diffraction angle associated with a pixel pitch of the pixel PX2. In this case, the amplitude and/or phase of the light R2 may be modulated by the control of the SLM 30.

The light R3 is refracted in the horizontal and vertical directions, depending on a refraction angle of the electrowetting prism EWP3, while passing through the electrowetting prism EWP3. In an exemplary embodiment of the present invention, the light R3 is refracted by an angle $\varnothing_{3a}$ in the vertical direction (y), while passing through the electrowetting prism EWP3.

The light R3, transmitted through the electrowetting prism EWP3, is incident on the pixel PX3 of the SLM 30. The light R3 may be diffracted by an angle $\varnothing_{3b}$ in the vertical direction (y) by the pixel PX3. The angle $\varnothing_{3b}$ depends on a diffraction angle associated with a pixel pitch of the pixel PX3. In this case, an amplitude and/or phase of the light R3 may be modulated by the control of the SLM 30.

The lights R1, R2, and R3 cross each other at specific contact points, and reconstruct the holographic image HI by using an interference effect. In this case, angles at which the lights R1, R2, and R3 cross each other may determine a viewing angle of the holographic image HI. For example, a user may see a clear holographic image HI within the horizontal viewing angle $\theta_T$ and the vertical viewing angle $\varnothing_T$.

As illustrated, the horizontal viewing angle $\theta_T$ is a sum of an angle $\theta_1$, contributed by the light R1, and an angle $\theta_2$, contributed by the light R2. The angle $\theta_1$ is a sum of the angle $\theta_{1a}$, contributed by the electrowetting prism EWP1, and the angle $\theta_{1b}$, contributed by the pixel PX1. In addition, the angle $\theta_2$ is a sum of the angle $\theta_{2a}$, contributed by electrowetting prism EWP2, and the angle $\theta_{2b}$, contributed by the pixel PX2.

The vertical viewing angle $\varnothing_T$ is a sum of an angle $\varnothing_2$, contributed by the light R2, and an angle $\varnothing_3$, contributed by the light R3. The angle $\varnothing_2$ is a sum of the angle $\varnothing_{2a}$, contributed by the electrowetting prism EWP2, and the angle $\varnothing_{2b}$ contributed by the pixel PX2. In addition, the angle $\varnothing_3$ is a sum of the angle $\varnothing_{3a}$, contributed by the electrowetting prism EWP3, and the angle $\varnothing_{3b}$, contributed by the pixel PX3.

For example, according to an exemplary embodiment of the present invention, the optical path adjuster 20 of the holographic image display device 1a, may have an increased horizontal viewing angle $\theta_T$ and an increased vertical viewing angle $\varnothing_T$. The increased horizontal viewing angle $\theta_T$ is increased by the sum of the angle $\theta_{1a}$ and the angle $\theta_{2a}$. The increased vertical viewing angle $\varnothing_T$ is increased by the sum of the angle $\varnothing_{2a}$ and the angle $\varnothing_{3a}$. Accordingly, a user of the holographic image display device 1a may view the holographic image HI more easily due to the increased horizontal and vertical viewing angles $\theta_T$ and $\varnothing_T$.

In addition, due to the increased horizontal and vertical viewing angles $\theta_T$ and $\varnothing_T$, the holographic image HI may be formed close to the holographic image display device 1a. For example, a distance d1 between the holographic image display device 1a and the holographic image HI may be small due to the increased horizontal and vertical viewing angles $\theta_T$ and $\varnothing_T$. When the distance d1 is small, the holographic image display device 1a can be implemented in a mobile device which is viewed by the user at a relatively short distance. For example, the increased horizontal and vertical viewing angles $\theta_T$ and $\varnothing_T$ may reduce the distance d1.

Figure 1B:
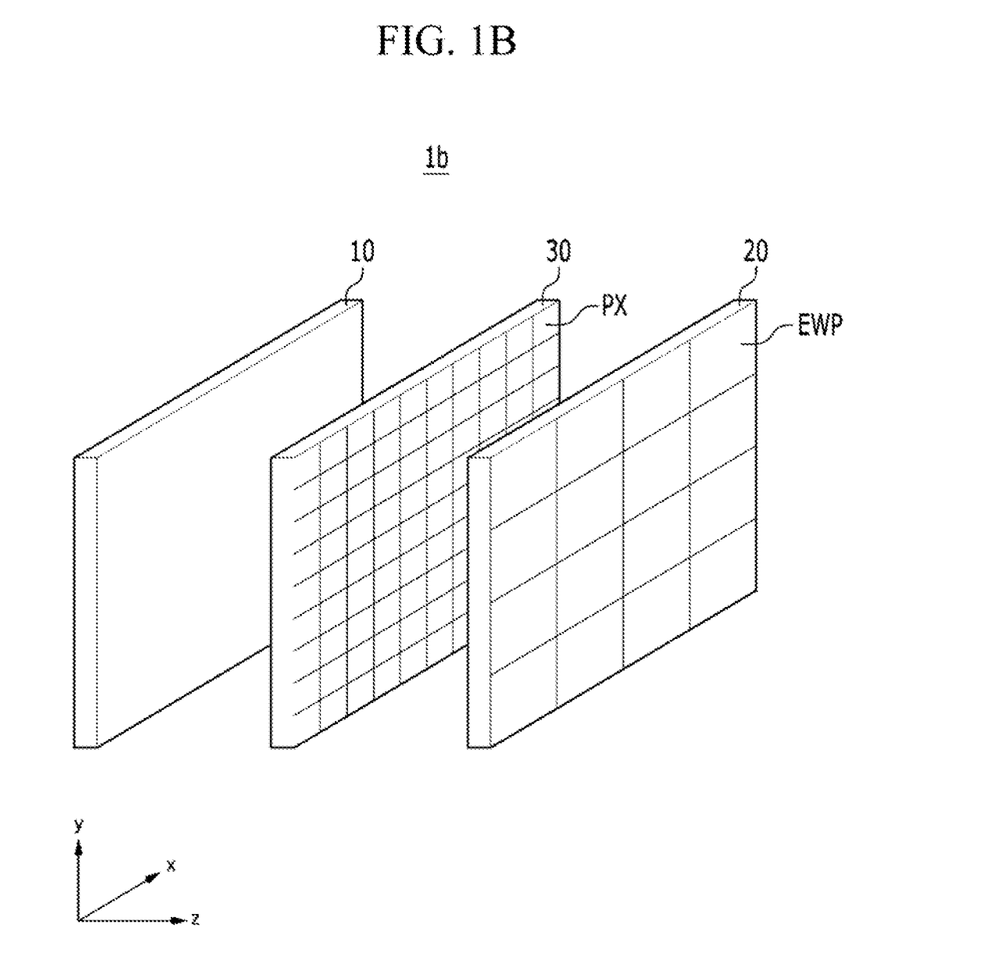
FIG. 1B is an exploded perspective view illustrating a holographic image display device according to an exemplary embodiment of the present invention.

FIG. 1B is an exploded perspective view illustrating a holographic image display device according to an exemplary embodiment of the present invention.

Referring to FIG. 1B, a holographic image display device 1b, according to an exemplary embodiment of the present invention, includes a backlight 10, an SLM 30, and an optical path adjuster 20.

The holographic image display device 1b differs from the holographic image display device 1a of the FIG. 1A in that positions of the SLM 30 and the optical path adjuster 20 are interchanged with each other.

For example, in the holographic image display device 1b, the SLM 30 is positioned between the backlight 10 and the optical path adjuster 20. The optical path adjuster 20 adjusts an optical path of light modulated by the SLM 30.

Although the SLM 30 is positioned between the backlight 10 and the optical path adjuster 20, the holographic image display device 1b may have the same or similar holographic display features as that of the holographic image display device 1a. This is so because the horizontal and vertical viewing angles of the holographic image display device 1b are represented by a sum of an angle diffracted by a pixel PX and an angle refracted by an electrowetting prism EWP, as in the holographic image display device 1a.

Since an operation of the holographic image display device 1b may be similar to that of the holographic image display device 1a of the FIG. 1A, a detailed description thereof is omitted for brevity.

Figure 2A:
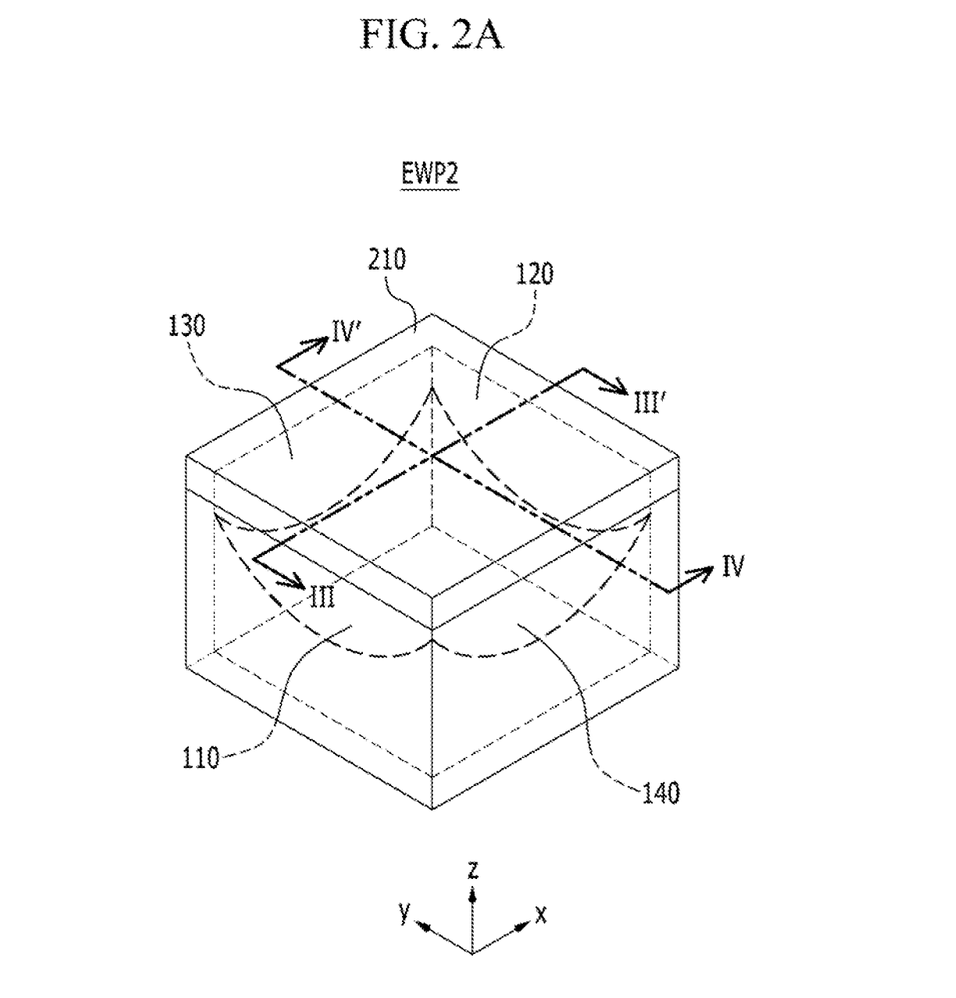
FIG. 2A illustrates an electrowetting prism, according to an exemplary embodiment of the present invention.
Figure 2B:
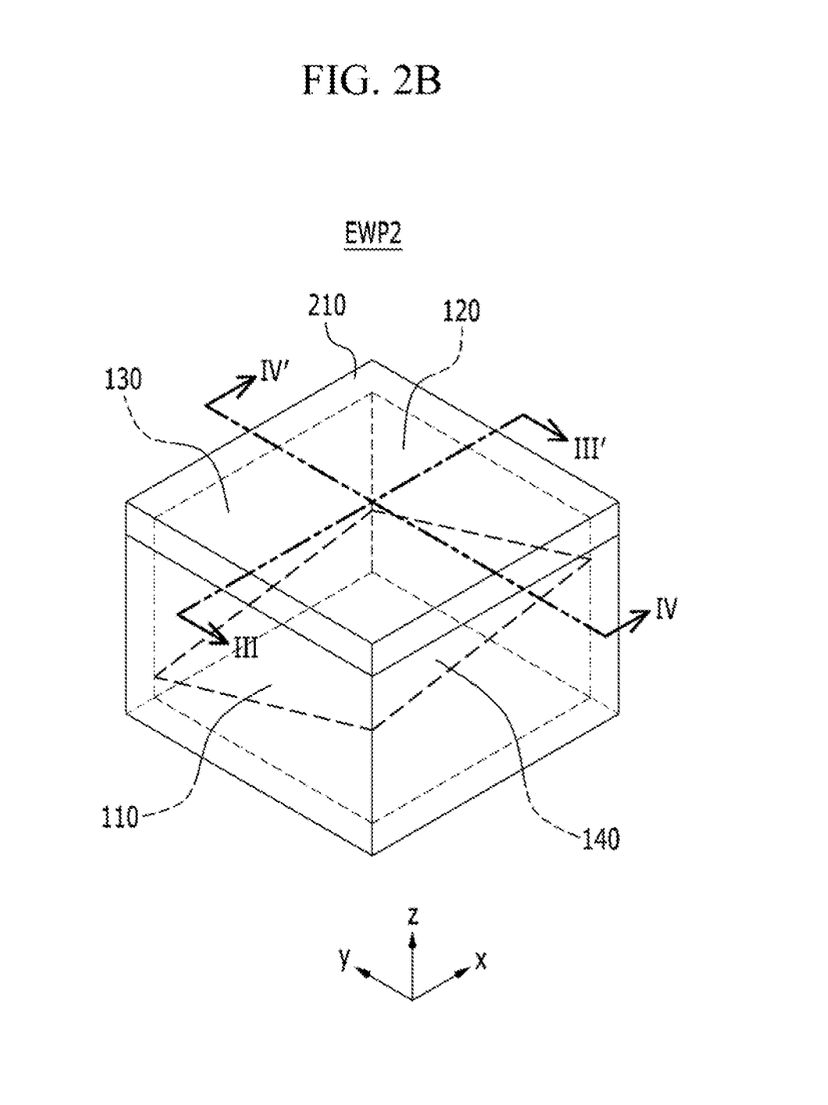
FIG. 2B illustrates an electrowetting prism, according to an exemplary embodiment of the present invention.

FIG. 2A illustrates an electrowetting prism, according to an exemplary embodiment of the present invention. FIG. 2B illustrates an electrowetting prism, according to an exemplary embodiment of the present invention. In more detail, FIG. 2A illustrates a case in which no voltage is applied to an electrowetting prism EWP2, and FIG. 2B illustrates a case in which a voltage is applied to the electrowetting prism EWP2.

Figure 3A:
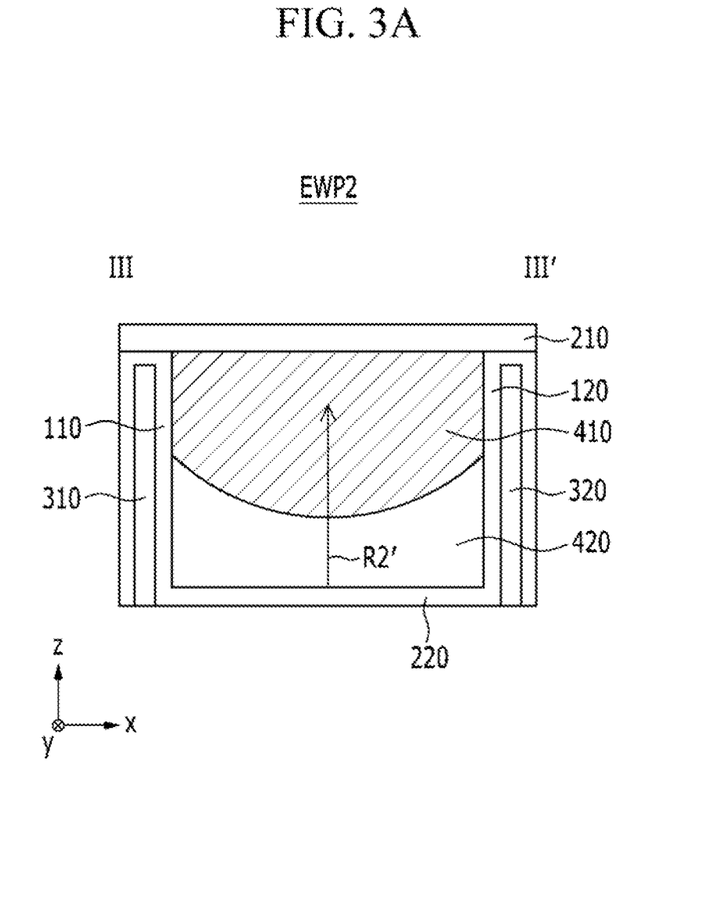
FIG. 3A is a cross-sectional view taken along line of FIG. 2A, according to an exemplary embodiment of the present invention.
Figure 3B:
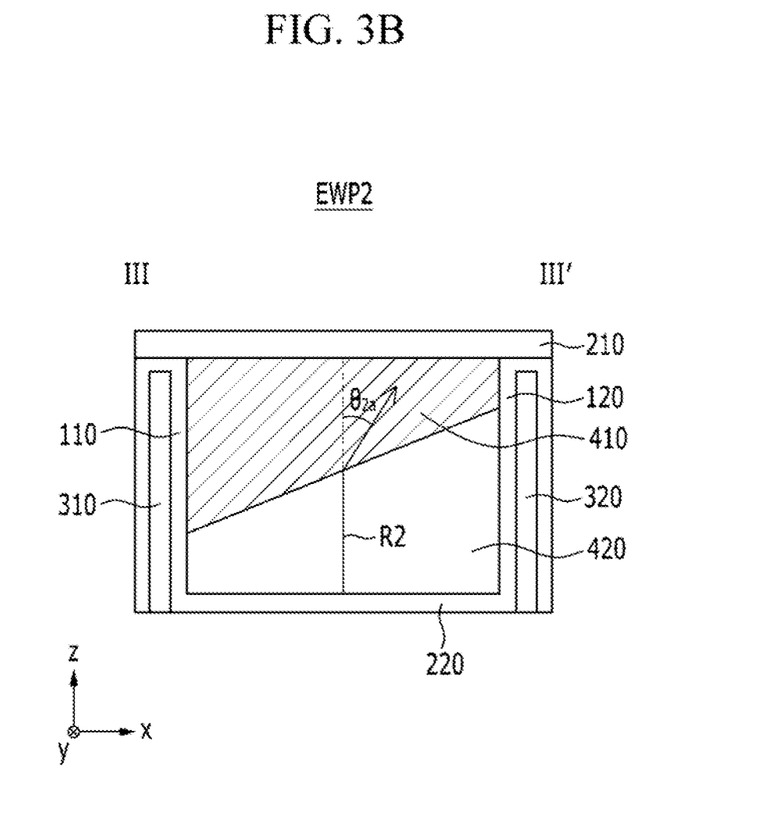
FIG. 3B is a cross-sectional view taken along line of FIG. 2B, according to an exemplary embodiment of the present invention.

FIG. 3A is a cross-sectional view taken along line of FIG. 2A, according to an exemplary embodiment of the present invention. FIG. 3B is a cross-sectional view taken along line of FIG. 2B, according to an exemplary embodiment of the present invention. An angle $\theta_{2a}$ at which light R2 is refracted in a horizontal direction (x) will now be described with reference to FIGS. 2A, 2B, 3A, and 3B.

Referring to FIGS. 2A and 3A, the electrowetting prism EWP2, according to an exemplary embodiment of the present invention, includes a first dielectric side wall 110, a first electrode 310, a second dielectric side wall 120, a second electrode 320, an upper substrate 210, a dielectric lower wall 220, and an interface-determining material 410. The electrowetting prism EWP2 may optionally further include an interface-determining auxiliary material 420.

The first dielectric side wall 110 internally includes the first electrode 310. The first dielectric side wall 110 insulates the first electrode 310 from the interface-determining material 410.

The second dielectric side wall 120 internally includes the second electrode 320. The second dielectric side wall 120 insulates the second electrode 320 from the interface-determining material 410.

In an exemplary embodiment of the present invention, the first and second dielectric side walls 110 and 120 may be formed of a hydrophobic dielectric. Whether the first and second dielectric side walls 110 and 120 are to be formed of a hydrophobic dielectric or a hydrophilic dielectric is determined by properties of the interface-determining material 410.

In an exemplary embodiment of the present invention, it is assumed that the interface-determining material 410 is a hydrophilic solution. For example, the interface-determining material 410 may be a solution in which a surfactant, glycols, salts, or other components are added. By adding other components to the interface-determining material 410, surface tension and electrical conductivity with the interface-determining auxiliary material 420 may be adjusted.

The interface-determining material 410 is configured such that a shape and an angle of the interface-determining material 410 are changed depending on voltages applied to the first electrode 310 and the second electrode 320.

A bonding property of the interface-determining auxiliary material 420 with water may be opposite to a bonding property of the interface-determining material 410 with water. In an exemplary embodiment of the present invention, since the interface-determining material 410 is a hydrophilic solution, the interface-determining auxiliary material 420 may be a hydrophobic liquid. A refractive index of the interface-determining auxiliary material 420 may be higher than that of the interface-determining material 410.

The dielectric lower wall 220 and the upper substrate 210 seals the interface-determining material 410 and the interface-determining auxiliary material 420 to prevent the interface-determining material 410 and the interface-determining auxiliary material 420 from leaking. For example, the dielectric lower wall 220 and the upper substrate 210 prevent the interface-determining material 410 and the interface-determining auxiliary material 420 from leaking from the electrowetting prism EWP2.

The dielectric lower wall 220 may be formed of the same material as the first and second dielectric side walls 110 and 120. Constituent materials of the upper substrate 210 may include glass, plastic, etc. In an exemplary embodiment of the present invention, the dielectric lower wall may internally include the lower electrode. In an exemplary embodiment of the present invention, the upper substrate may internally include the upper electrode.

No voltage is applied to the first electrode 310 and the second electrode 320 of FIGS. 2A and 3A. Accordingly, the interface-determining auxiliary material 420, which is a hydrophobic liquid, is symmetrically dispersed along the first and second dielectric side walls 110 and 120. The light R2' is minimally refracted and travels straight in the direction (z) since it passes substantially perpendicularly to the interface-determining material 410 and the interface-determining auxiliary material 420. For example, the light R2' passes substantially perpendicularly to the interface between the interface-determining material 410 and the interface-determining auxiliary material 420.

A high voltage is applied to the first electrode 310 while a relatively low voltage is applied to the second electrode 320 of FIGS. 2B and 3B. Accordingly, an electric field is applied to the interface-determining material 410. The interface-determining material 410 moves toward the first electrode 310 due to electrowetting. As a result, the shape and the angle of the interface between the interface-determining material 410 and the interface-determining auxiliary material 420 is changed as shown in FIGS. 2B and 3B.

Accordingly, as shown in FIGS. 2B and 3B, the light R2 is refracted by the angle $\theta_{2a}$ in the horizontal direction (x) based on the refractive indices of the interface-determining auxiliary material 420 and the interface-determining material 410, and an angle $\theta_{2a}$ of the interface between the interface-determining auxiliary material 420 and the interface-determining material 410. In an exemplary embodiment of the present invention, the interface-determining material 410 moves toward the electrode to which the high voltage is applied. However, in an exemplary embodiment of the present invention, the interface-determining material may move toward the electrode to which the low voltage is applied. In this case, constituent materials of the interface-determining material may vary.

Figure 4A:
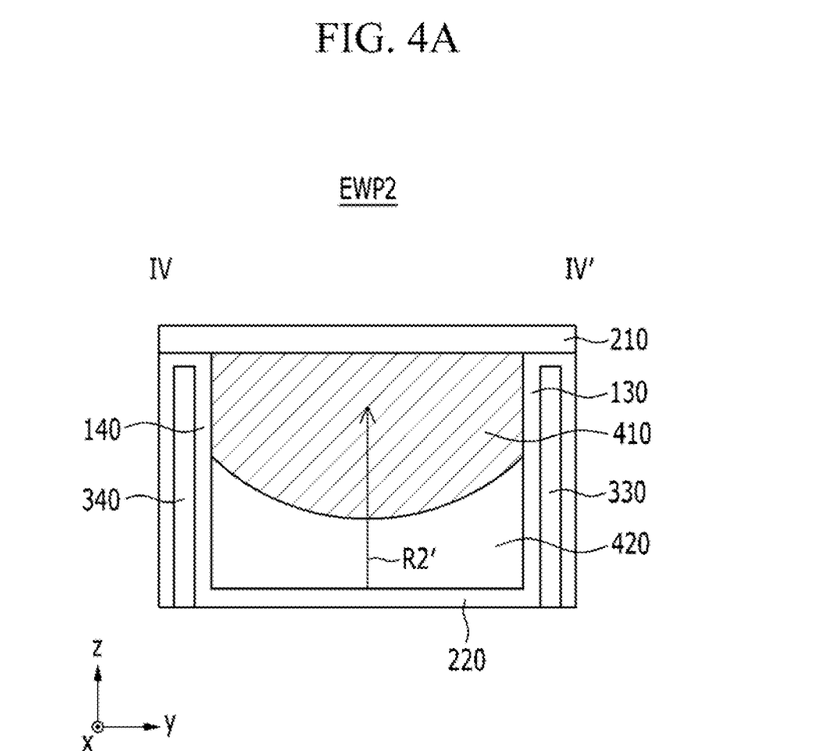
FIG. 4A is a cross-sectional view taken along line IV-IV' of FIG. 2A, according to an exemplary embodiment of the present invention.
Figure 4B:
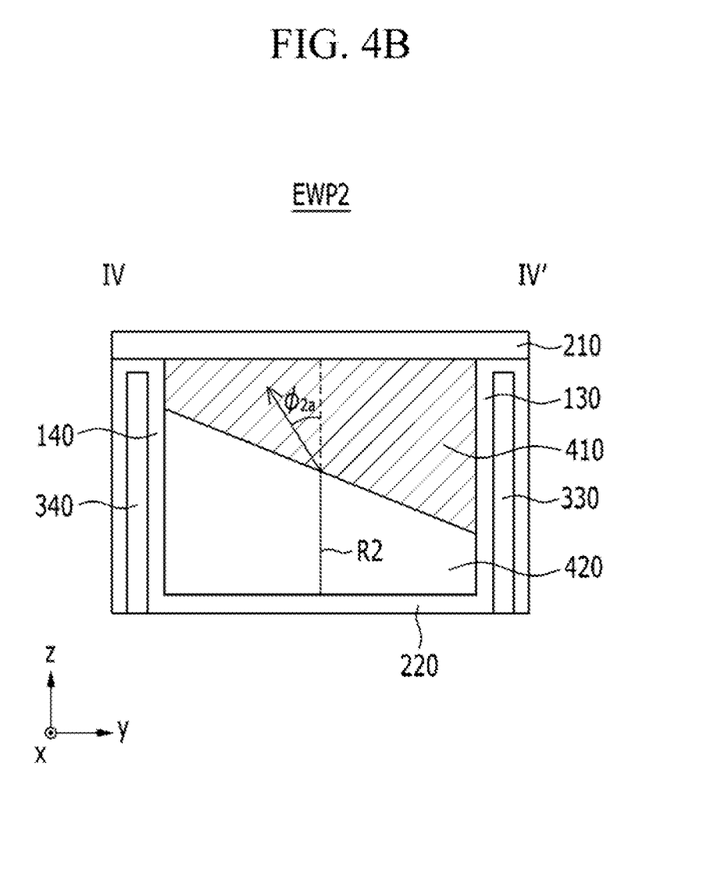
FIG. 4B is a cross-sectional view taken along line IV-IV' of FIG. 2B, according to an exemplary embodiment of the present invention.

FIG. 4A is a cross-sectional view taken along line IV-IV' of FIG. 2A, according to an exemplary embodiment of the present invention. FIG. 4B is a cross-sectional view taken along line IV-IV' of FIG. 2B, according to an exemplary embodiment of the present invention. An angle $\varnothing_{2a}$ at which the light R2 is refracted in a vertical direction (-y) will now be described with reference to FIGS. 2A, 2B, 4A, and 4B.

Referring to FIGS. 2A and 4A, the electrowetting prism EWP2, according to an exemplary embodiment of the present invention, further includes a third dielectric side wall 130, a third electrode 330, a fourth dielectric side wall 140, and a fourth electrode 340. The upper substrate 210, the dielectric lower wall 220, the interface-determining material 410, and the interface-determining auxiliary material 420 will not be described again since they are the same as those described with reference to FIGS. 2A and 3A.

The third dielectric side wall 130 internally includes the third electrode 330. The third dielectric side wall 130 insulates the third electrode 330 from the interface-determining material 410.

The fourth dielectric side wall 140 internally includes the fourth electrode 340. The fourth dielectric side wall 140 insulates the fourth electrode 340 from the interface-determining material 410.

The third and fourth dielectric side walls 130 and 140 may include the same constituent materials as the first and second dielectric side walls 110 and 120. Accordingly, in an exemplary embodiment of the present invention, the third and fourth dielectric side walls 130 and 140 may be formed of a hydrophobic dielectric.

No voltage is applied to the third electrode 330 or the fourth electrode 340 of FIGS. 2A and 4A. Accordingly, the interface-determining auxiliary material 420, which is a hydrophobic liquid, is symmetrically dispersed along the third and fourth dielectric side walls 130 and 140 which are formed of hydrophobic dielectrics. The light R2' is minimally refracted and travels straight in the direction (z) since it passes substantially perpendicularly to the interface-determining material 410 and the interface-determining auxiliary material 420. For example, the light R2' passes substantially perpendicularly to the interface between the interface-determining material 410 and the interface-determining auxiliary material 420.

A high voltage is applied to third electrode 330 while a relatively low voltage is applied to the fourth electrode 340 of FIGS. 2B and 4B. Accordingly, an electric field is applied to the interface-determining material 410. The interface-determining material 410 moves toward the third electrode 330 due to electrowetting. As a result, the shape and the angle of the interface between the interface-determining material 410 and the interface-determining auxiliary material 420 is changed as shown in FIGS. 2B and 4B.

Accordingly, as shown in FIGS. 2B and 4B, the light R2 is refracted by an angle $\varnothing_{2a}$ in the vertical direction (-y) based on the refractive indices of the interface-determining auxiliary material 420 and the interface-determining material 410, and the angle of the interface between the interface-determining material 410 and the interface-determining auxiliary material 420.

The configuration of the electrowetting prism EWP2 described above is provided as an example for describing conversion of the optical path of light by the optical path adjuster 20, and how the holographic image display device 1a or 1b including the optical path adjuster 20 works, according to one or more exemplary embodiment of the present invention. For example, the holographic image display device 1a or 1b uses electrowetting to create a holographic image HI. The horizontal and vertical viewing angles $\theta_T$ and $\varnothing_T$ of the holographic image display device 1a or 1b is large because the light emitted from the backlight 10 is refracted by the optical path adjuster 20 and is diffracted by the SLM 30. For example, the electrowetting prisms EWP1 to EWPn of the optical path adjuster 20 refract the light in the horizontal and vertical directions, and the pixels PX1 to PXn of the SLM 30 diffract the light in the horizontal direction and vertical direction.

In addition, in an exemplary embodiment of the present invention, the holographic image display device 1a or 1b may further include a user viewpoint tracker. The user viewpoint tracker may track the user's viewpoint position, and the holographic image display device 1a or 1b may change a position and a viewing angle at which the holographic image HI is formed according to the user's viewpoint position. Accordingly, even if the user's viewpoint moves horizontally or vertically, the holographic image display device 1a or 1b can track the user's movement and create the holographic image HI at an optimal position for the moved viewpoint of the user.

In an exemplary embodiment of the present invention, the optical path adjuster 20 may adjust the angle of the plurality of electrowetting prisms EWP1 to EWPn differently, depending on whether the holographic image display device 1a or 1b is operated in a three-dimensional (3D) mode or in a two-dimensional (2D) mode.

While the present invention has been particularly shown and described with reference to exemplary embodiments thereof, it will be apparent to those of ordinary skill in the art that various changes in form and detail may be made therein without departing from the spirit and scope of the invention.

What is claimed is:

1. A holographic image display device, comprising:
a backlight;
an optical path adjuster disposed on the backlight; and
a spatial light modulator disposed on the backlight,
wherein the optical path adjuster is configured to refract light emitted from the backlight in a first direction and in a second direction that crosses the first direction,
wherein an angle of refraction of the light in the first and second directions is proportional to voltages applied to the optical path adjuster, and
wherein the spatial light modulator is configured to modulate an amplitude or a phase of the light emitted from the backlight in the first and second directions.

2. The holographic image display device of claim 1, wherein the optical path adjuster is disposed between the backlight and the spatial light modulator, wherein the optical path adjuster includes an electrowetting prism, and the spatial light modulator includes a pixel that corresponds to the electrowetting prism, and wherein the electrowetting prism is configured to refract the light emitted from the backlight in the first and second directions based on the voltages applied to the optical path adjuster, and the pixel diffracts the refracted light, having passed through the electrowetting prism, in the first and second directions.

3. The holographic image display device of claim 2, wherein the electrowetting prism includes first and second electrodes disposed along the first direction, and third and fourth electrodes disposed along the second direction, wherein the electrowetting prism includes an interface-determining material, wherein the interface-determining material is disposed between the first and second electrodes and between the third and fourth electrodes.

4. The holographic image display device of claim 3, wherein the light emitted from the backlight is not refracted by the electrowetting prism when no voltage is applied to the first, second, third and fourth electrodes.

5. The holographic image display device of claim 3, wherein, when different voltages are applied to the first and second electrodes, a shape of the interface-determining material changes inside of the electrowetting prism, and the light emitted from the backlight is refracted in the first direction while passing through the electrowetting prism.

6. The holographic image display device of claim 3, wherein, when different voltages are applied to the third and fourth electrodes, a shape of the interface-determining material changes inside of the electrowetting prism, and the light emitted from the backlight is refracted in the second direction while passing through the electrowetting prism.

7. The holographic image display device of claim 2, wherein a size of the electrowetting prism is smaller than a size of the pixel.

8. The holographic image display device of claim 1, wherein a viewing angle of the holographic image display device in the first direction is a sum of a first angle and a second angle, and a viewing angle of the holographic image display device in the second direction is a sum of a third angle and a fourth angle, wherein the first angle is an angle by which the optical path adjuster refracts the light in the first direction, and the second angle is an angle by which the spatial light modulator diffracts the light in the first direction, and wherein the third angle is an angle by which the optical path adjuster refracts the light in the second direction, and the fourth angle is an angle by which the spatial light modulator diffracts the light in the second direction.

9. The holographic image display device of claim 1, wherein the spatial light modulator is disposed between the backlight and the optical path adjuster, wherein the optical path adjuster includes an electrowetting prism, and the spatial light modulator includes a pixel that corresponds to the electrowetting prism, and wherein the pixel diffracts the light emitted from the backlight in the first and second directions, and the electrowetting prism is configured to refract the diffracted light, having passed through the pixel, in the first and second directions.

\* \* \* \* \*